(12) United States Patent
Edvardsen et al.

(10) Patent No.: US 8,066,062 B2
(45) Date of Patent: Nov. 29, 2011

(54) SEAL FOR A DRILL STRING

(75) Inventors: Per Espen Edvardsen, Fyllingsdalen (NO); Tom Kjetil Askeland, Straume (NO)

(73) Assignee: Siem Wis AS, Knarrevik (NO)

( * ) Notice: Subject to any disclaimer, the term of this patent is extended or adjusted under 35 U.S.C. 154(b) by 0 days.

(21) Appl. No.: 12/597,823

(22) PCT Filed: Apr. 4, 2008

(86) PCT No.: PCT/NO2008/000125
§ 371 (c)(1),
(2), (4) Date: May 5, 2010

(87) PCT Pub. No.: WO2008/133523
PCT Pub. Date: Nov. 6, 2008

(65) Prior Publication Data
US 2010/0218937 A1  Sep. 2, 2010

(30) Foreign Application Priority Data

Apr. 27, 2007 (NO) .................................. 20072220

(51) Int. Cl.
*E21B 33/02* (2006.01)
(52) U.S. Cl. .................................... 166/84.2
(58) Field of Classification Search .................. 166/387, 166/84.4, 84.2
See application file for complete search history.

(56) References Cited

U.S. PATENT DOCUMENTS

| | | | | |
|---|---|---|---|---|
| 1,875,632 A * | 9/1932 | McEvoy | | 277/343 |
| 2,222,082 A * | 11/1940 | Leman et al. | | 175/195 |
| 3,387,851 A * | 6/1968 | Cugini | | 277/318 |
| 3,965,987 A * | 6/1976 | Biffle | | 166/379 |
| 6,325,159 B1 * | 12/2001 | Peterman et al. | | 175/7 |
| 7,258,171 B2 * | 8/2007 | Bourgoyne et al. | | 166/382 |
| 7,779,903 B2 * | 8/2010 | Bailey et al. | | 166/84.4 |
| 2005/0061499 A1 * | 3/2005 | Hopper | | 166/84.3 |
| 2006/0037782 A1 * | 2/2006 | Martin-Marshall | | 175/40 |
| 2010/0147525 A1 * | 6/2010 | Lerner et al. | | 166/332.1 |
| 2010/0175882 A1 * | 7/2010 | Bailey et al. | | 166/335 |

* cited by examiner

*Primary Examiner* — Daniel P Stephenson
(74) *Attorney, Agent, or Firm* — Kilpatrick Townsend & Stockton LLP

(57) ABSTRACT

Sealing arrangement for dynamic sealing around a drill stem (16) or a coiled tubing is described, comprising an elongated, dynamic sealing unit (10) which is arranged to surround the drill stem (16), in that the sealing unit (10) comprises a number of sets with main seals (20) arranged mutually spaced apart in the longitudinal direction of the sealing unit (10), where said main seals (20) comprise at least one disc-formed or ring-formed packer element (30) of an elastic material, such as an elastomeric material, arranged to surround said drill stem (16). Said main seal (20) comprises at least one inlet channel arranged to receive a friction reducing medium through or via the seal directly into the seal surface (32) of the packer element (30), against the drill stem (16).

9 Claims, 6 Drawing Sheets

SEAL FOR A DRILL STRING

This application is a national stage application that claims priority under 35 USC §§ 365 and 371 to PCT/NO08/000125 filed Apr. 4, 2008, which claims priority to NO 20072220, filed Apr. 27, 2007.

The present invention relates to a sealing arrangement for dynamic sealing around a drill stem or a coiled tubing, comprising an elongated, dynamic sealing unit which is setup to surround the drill stem, with the sealing unit comprising a number of main seal sets arranged mutually spaced apart in the longitudinal direction of the sealing unit, where said main seals comprise at least one disc-formed or ring-formed packer element from an elastic material such as an elastomer, arranged to surround said drill stem.

The invention can be used to seal around the drill stem or coiled tubing that moves into, or out of, oil wells and gas wells in all water-carrying, drilling-fluid carrying or hydrocarbon-carrying types of wells, wells that have a valve tree (well safety valves) placed on the ocean bottom, or on a platform, or on a vessel, or on an installation or on land.

The invention relates to systems and methods that make it possible to intervene and drill in above mentioned water-carrying, drilling-fluid carrying or hydrocarbon-carrying wells, and for ocean bottom based wells; both with and without using riser pipe connections to surface vessels or other installations. The system and the method covers work in the above mentioned water-carrying, drilling-fluid carrying or hydrocarbon-carrying wells, carried out with the help of drill stems and coiled tubing, and also said methods based on the use of new composite materials and thermoplastic materials and also complementary solutions. The drill stem and coiled tubing are hereafter described using the term drill stem. With the expression downhole tools, one must understand different tools for operation in a well, i.e. equipment for drilling operations, intervention equipment, equipment for logging, measurements, fishing, etc.

The present invention can be used within several different areas. The following can be given as examples: for use as seals for units in wells on land, for use in units for continuous circulation of drilling fluids, for use for landing in a riser or a landing string, for use in seals in subsea applications.

The invention is a further development of the applicant's Norwegian patent application NO20053394, where the content is incorporated here as a reference.

The invention will, in a simplified way, represent a dynamic seal around a drill stem that moves into, or out of, water-carrying, drilling-fluid carrying or hydrocarbon-carrying wells. The invention is suited to situations where the well pressure is both higher than and lower than the surrounding pressure at the valve tree. This means that the invention will tolerate pressure from both sides during operation and testing.

The invention will be especially suited to operations that involve drilling through existing production pipes in a well, and then especially in ocean based wells were the invention, together with other systems, will be able to contribute to the removal of the riser connection to surface vessels or other installations.

Today's methods to carry out well interventions or drilling in ocean bottom installed wells with the help of drill stems or coiled tubing are based on using a riser connection between the well head and the surface equipment on the surface vessel or the installation. This requires a large, and thus costly, surface vessel or other installations which must have room for blowout safety valves (BOP) for risers, risers for the ocean depths at which the work will take place, and also other equipment that is required for pressure control and standby handling.

Today there are systems for dynamic sealing where pressure can be taken from one side.

One of the challenges of the existing dynamic sealing functions is their limitation with regard to friction that must be overcome to move the drill stem into or out of the well, and also the complexity of the many moving parts.

The present invention has an object of making possible the carrying out of a more flexible and cheaper well intervention and drilling operation, and also to reduce the friction between seal and drill stem and possibly to provide a pressure gradient if several seals are used.

In said NO20053394 it is described that grease or oil can be injected at high pressure in between the sealing sets. However, it is not mentioned that a friction reducing medium can be injected between the packer elements themselves in the seal.

The above mentioned object is achieved with a sealing arrangement which is defined in the independent claim 1, in that said main seal comprises at least one inlet channel arranged to receive a friction reducing medium through said seal directly into the seal surface of the packing element against the drill stem.

The invention shall now be described in more detail with reference to the enclosed figures, in which.

Figure 1:
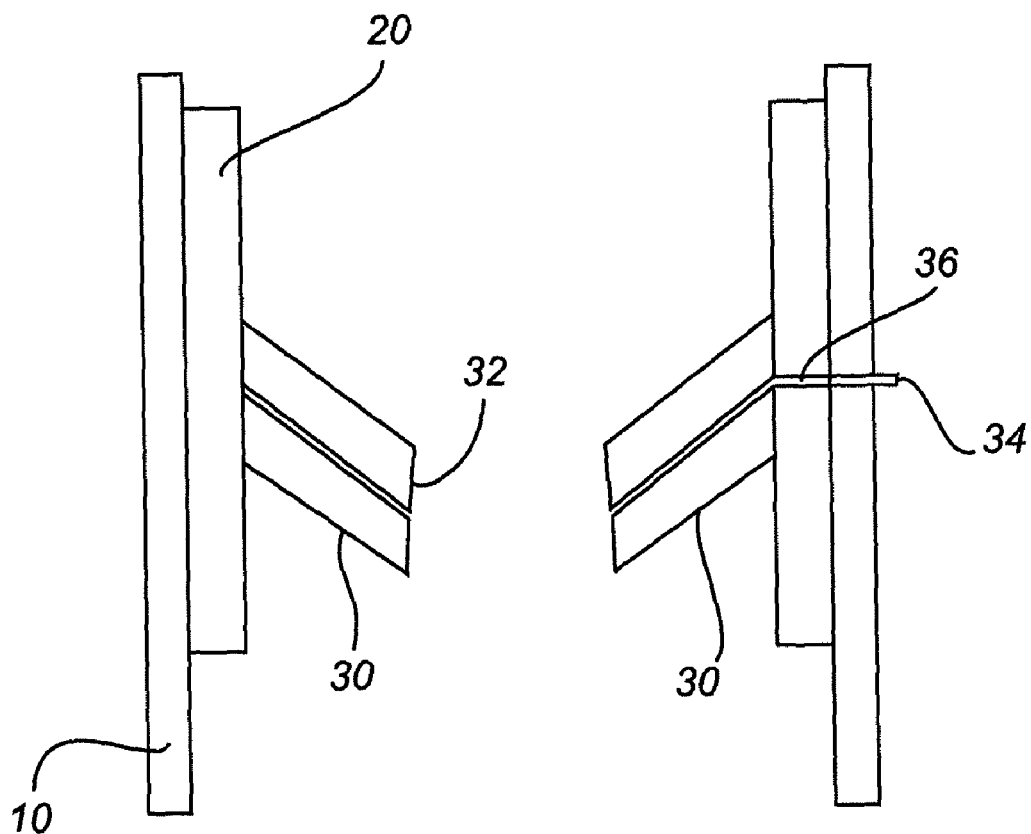
FIG. 1 shows a section of an embodiment of a sealing arrangement according to the invention.
Figure 2:
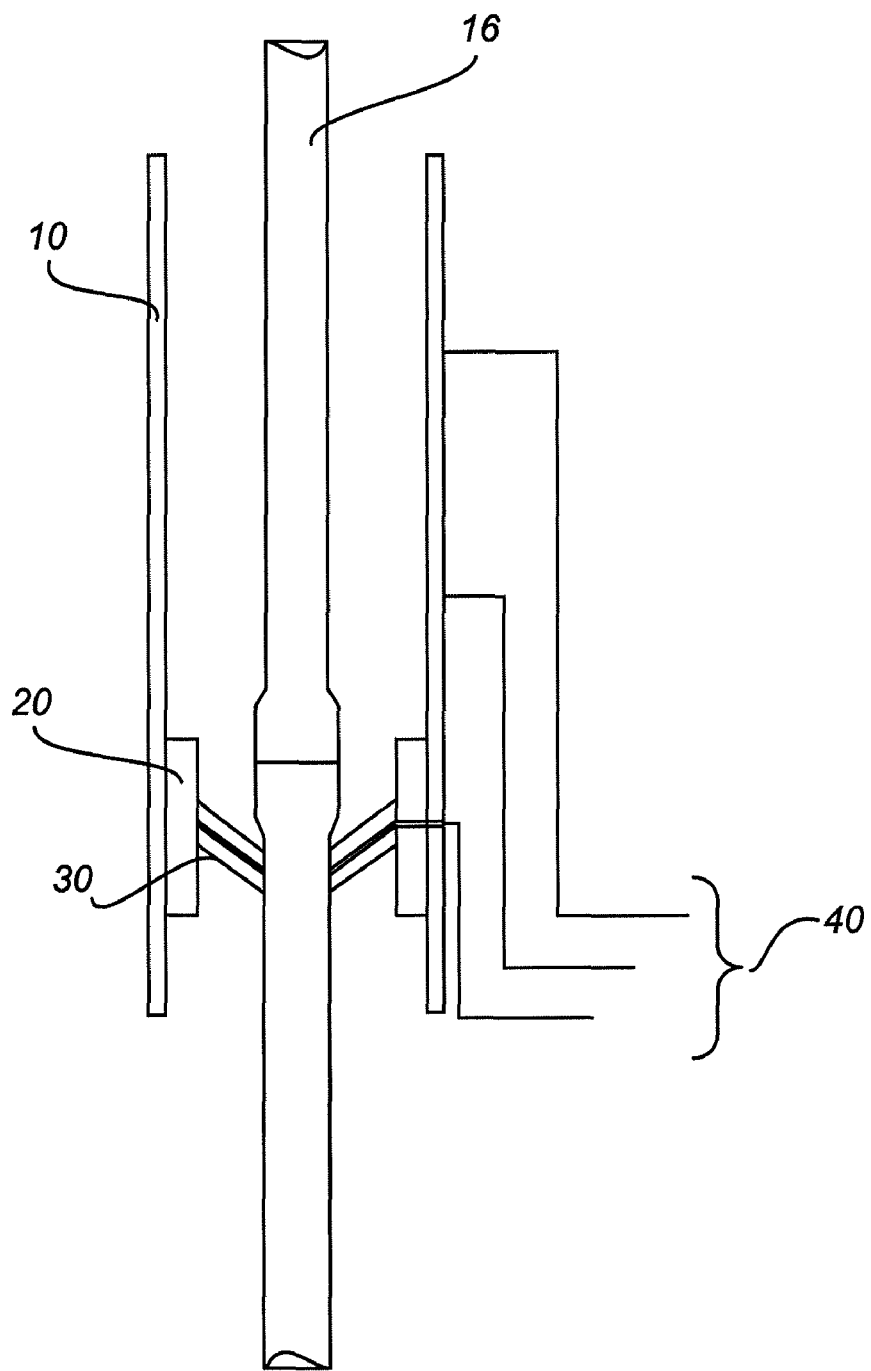
FIG. 2 shows an embodiment of a sealing arrangement with one main seal.
Figure 3:
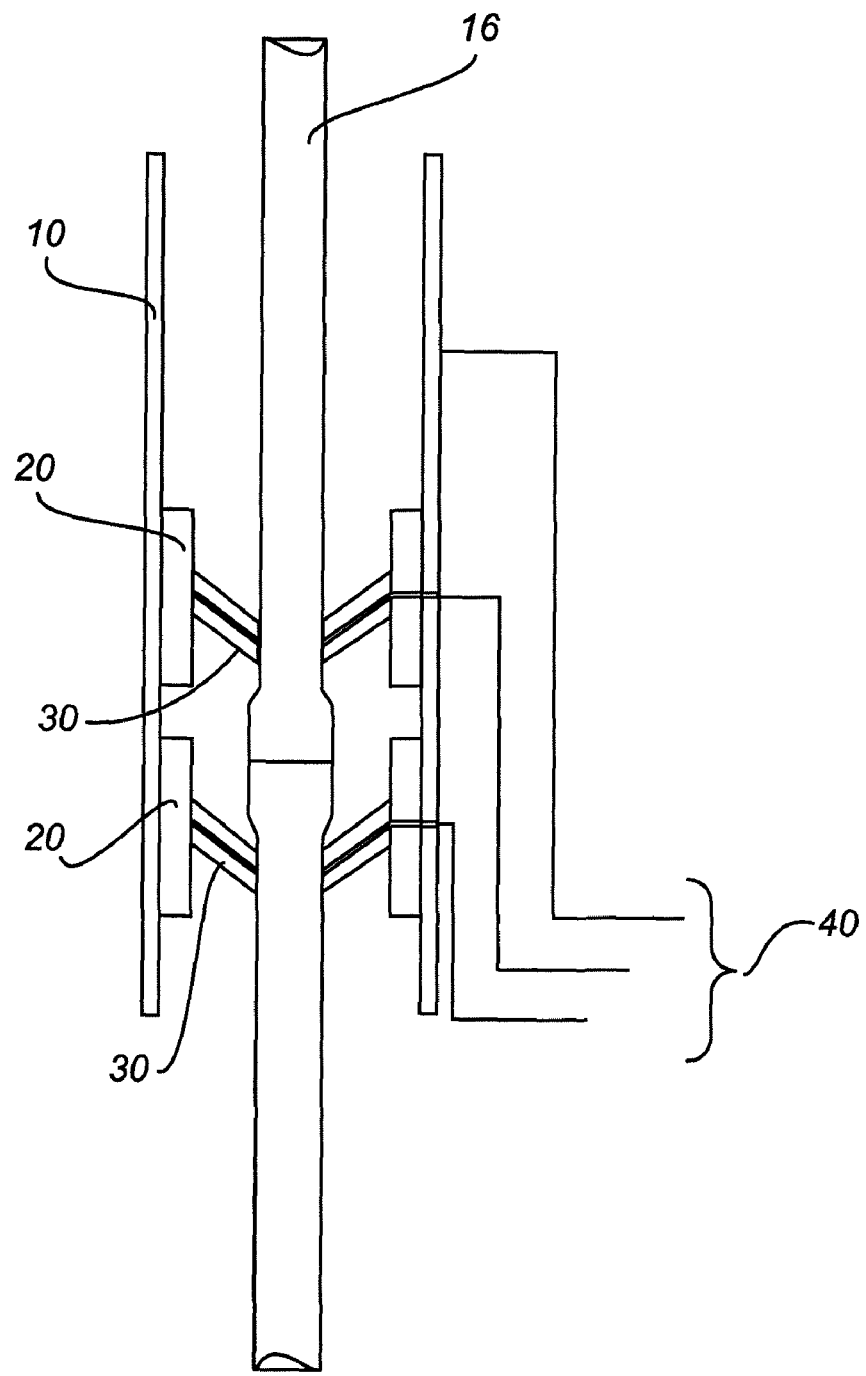
FIG. 3 shows an embodiment of a sealing arrangement with two main seals.
Figure 4:
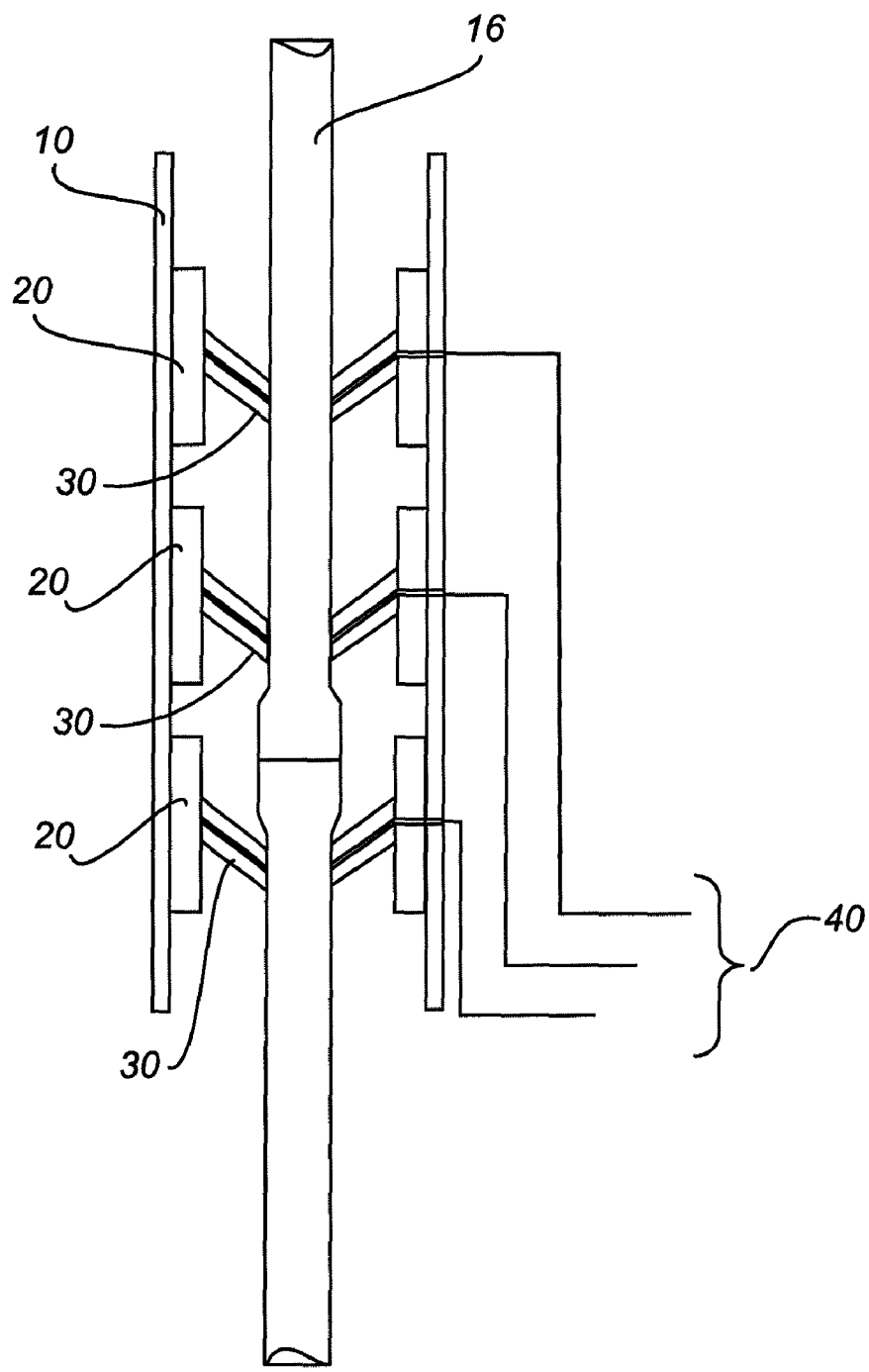
FIG. 4 shows an embodiment of a sealing arrangement with three main seals.
Figure 5:
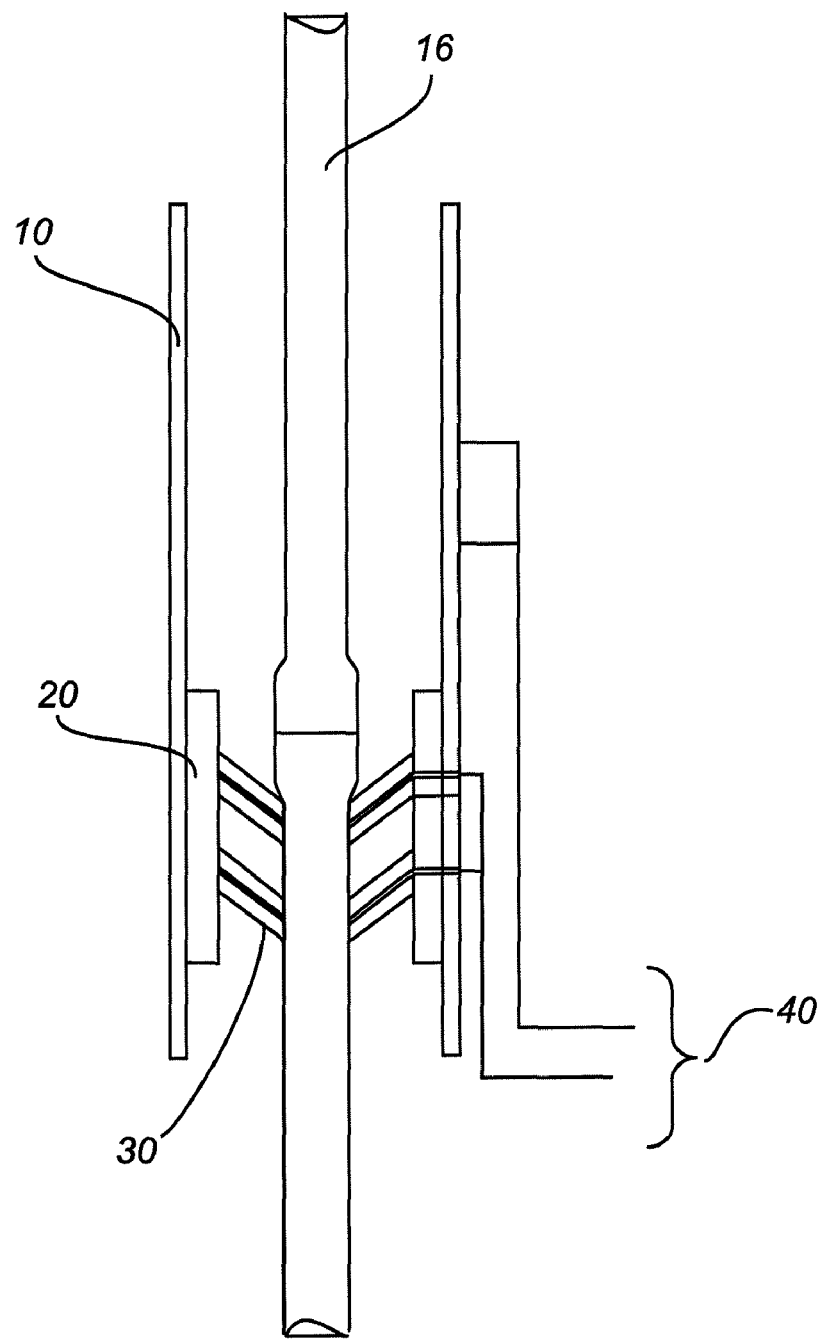
FIG. 5 show a further embodiment of a sealing arrangement with one set of main seals.
Figure 6:
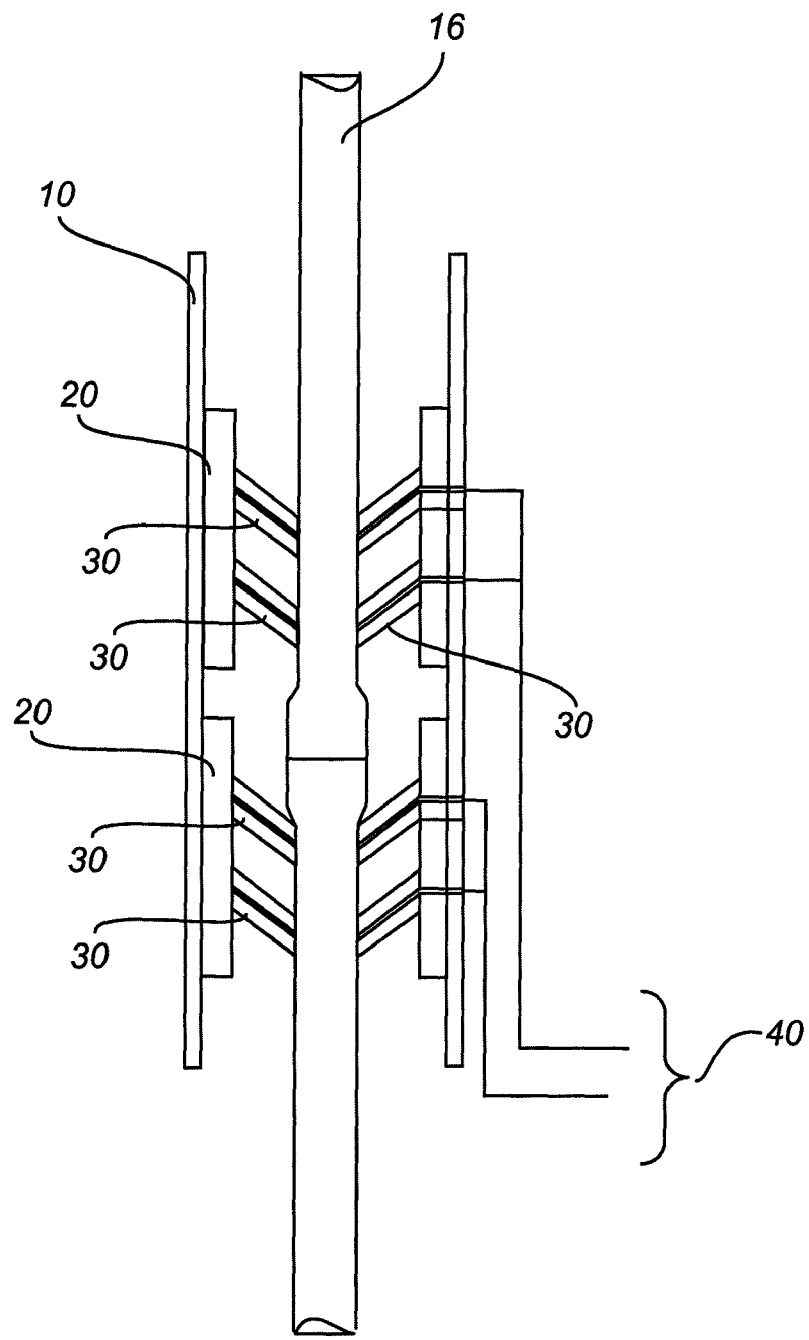
FIG. 6 shows a further embodiment of a sealing arrangement with two sets of main seals.

In the following, different embodiment examples are described, but it must be understood that other possible configurations are possible within the frame of the invention. One possible application area shall be described below, but the invention can also be used in other contexts as described earlier, such as sealing for units in a well on land, for use in units for continuous circulation of drilling fluids, or for use in landings inside a riser or landing string, etc.

In case of a detection of wear or leaks in a set of seals one can choose to drive down a new set and land over this. This can be repeated as many times as the unit is designed to receive. The seals can be driven hanging on a drill stem.

With the use of several seals, a pressure gradient can be established over the set of seals.

A friction reducing medium (oil, grease, etc) is injected through or via the sealing directly into the seal surface. The friction reducing medium has several properties, it shall; lubricate (lower the friction), cool, and increase the sealing effect of the seal by filling any irregularities between the seal and the drill stem.

An application of a sealing arrangement is described in said NO20053394.

An example of a method for driving a drill stem 16 into a pressurised well by using the dynamic sealing arrangement is as follows: The drill stem 16 goes into, or comes out of, the well (relevant to both overpressure and under-pressure and also pressure balance) through the dynamic seal 10 which is fitted at the top of the temporary well safety equipment. The drill stem 16 passes through preferably one or several sets of main seals 20 when it is moved.

The sets of main seals 20 can be placed with a mutual distance apart that leads to only one of the sets of seals 20 preferably being able to be exposed to one pipe connection in the drill stem 16 at any given time. Between the sets of seals 20 an environmentally friendly grease or oil can be injected at a pressure that exceeds the highest external pressure with typically 5-100 bar. The sets of seals 20 will, in this way, get pressure support so that they can withstand a higher external pressure. The drill stem is driven into the well with the help of the weight of the downhole tool, and also any forces exerted from external methods and systems.

Each of the sets 20 of main seals can comprise a number of packer elements 30 in the form of sealing discs, where the packer elements 30 are preferably formed in a plate form or disc form with a through-going opening. Other forms of the packer elements 30 are also, of course, possible. Said packer elements 30 in the sets of main seals 20 can be made from elastomers, either through-going or with internal pressure support. Other suitable composites with appropriate characteristics could also be used.

As can be seen in the enclosed figures, the friction reducing medium is preferably injected in the main seals 20 between the packer elements 30 via a canal or port 34 in the side wall of the sealing unit 10. Said canal or port 34 can be connected to an injector via tubes 40 arranged to inject said friction reducing medium. The main seal(s) 20 comprises at least one inlet channel 36 arranged to receive the friction reducing medium through said seal 20 directly into the seal surface 32 of the packer elements 30 against the drill stem 16.

The invention claimed is:

1. Sealing arrangement for dynamic sealing around a drill stem or coiled tubing, comprising an elongated, dynamic sealing unit which is arranged to surround the drill stem, in that the sealing unit comprises a number of sets of main seals arranged mutually spaced apart in the longitudinal direction of the sealing unit, where said main seals comprise at least one disc-formed or ring-formed packer element of an elastic material, arranged to surround said drill stem, wherein at least one of the main seals comprises at least one inlet channel arranged to inject a friction reducing medium directly into a seal surface of the packer element, against the drill stem and wherein said main seals comprise more than one disc-formed or ring-formed packer elements and said friction reducing medium is injected between said disc-formed or ring-formed packer elements.

2. Sealing arrangement according to claim 1, wherein the sealing unit is connected to an injector arranged to inject said friction reducing medium via a port in the side wall of the sealing unit.

3. Sealing arrangement according to claim 2, wherein said friction reducing medium is an oil, a grease or similar lubricating material.

4. Sealing arrangement according to claim 1, wherein said friction reducing medium is an oil, a grease or similar lubricating material.

5. Sealing arrangement according to claim 1, wherein the sealing unit is connected to an injector arranged to inject said friction reducing medium via a port in the side wall of the sealing unit.

6. Sealing arrangement according to claim 1, wherein said friction reducing medium is an oil, a grease or similar lubricating material.

7. Sealing arrangement according to claim 1, wherein the elastic material is an elastomeric material.

8. Method for dynamic sealing around a drill stem or coiled tubing, in which an elongated, dynamic sealing unit is surrounding the drill stem, and the sealing unit comprises a number of sets of main seals arranged mutually spaced apart in the longitudinal direction of the sealing unit, where said main seals comprise at least one disc-formed or ring-formed packer element of an elastic material, arranged to surround said drill stem, wherein a friction reducing medium is being injected, through at least one inlet channel in the main seal, directly into a seal surface of the packer element and against the drill stem and wherein said main seals comprise more than one disc-formed or ring-formed packer elements and said friction reducing medium is injected between said disc-formed or ring-formed packer elements.

9. The method according to claim 8, wherein the elastic material is an elastomeric material.

* * * * *